Patented Nov. 9, 1937

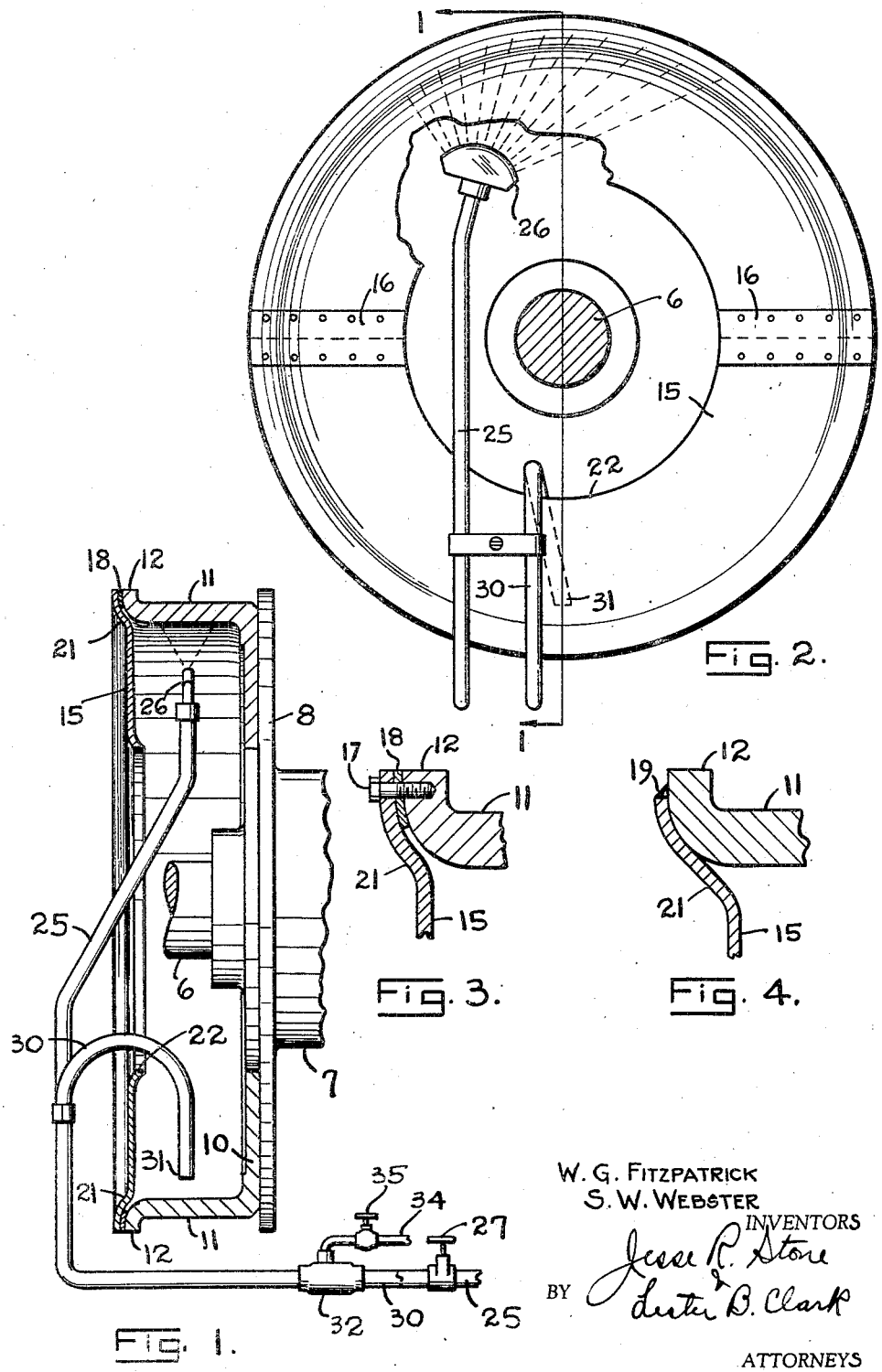

2,098,490

UNITED STATES PATENT OFFICE 2,098,490

WATER-COOLED BRAKE DRUM

Walter G. Fitzpatrick, Houston, and Samuel W. Webster, Dallas, Tex.

Application November 16, 1934, Serial No. 753,322

7 Claims. (Cl. 188—264)

The invention to be hereinafter described relates to water cooled brake rims, and is particularly directed to that type of construction wherein the cooling fluid is directed against and over the surface to be cooled as distinguished from a closed circulating system.

The invention is particularly applicable for use in connection with hoists or drawworks of the general type disclosed in the patent to J. D. Spalding, No. 1,918,501, July 18, 1933, which, however, shows a cooling system of the closed type.

It is an object of the invention to provide a means of circulating a cooling fluid into and out of an annular trough within a rotatable brake rim.

It is also an object of the invention to provide a positive and effective means of removing fluid from a rotatable annular trough of a brake rim.

It is a further object of the invention to provide a spray head on a pipe to discharge cooling water against the upper, inner portion of a brake rim so that the water will drain over the entire surface.

It is still another object of the invention to provide a brake rim having inwardly extending flanges forming an annular trough through which cooling water may be circulated.

Another object of the invention is to provide an annular plate for convenient attachment to conventional brake rims to provide a suitable annular trough, and to form such plate so that temperature strains will be substantially eliminated.

Another object of the invention is to provide a suction pipe to remove water from a rotatable annular trough.

Another object of the invention is to provide an ejector for removing cooling water from an annular trough in a brake rim.

A still further object of the invention is to provide a water removal means in a rotatable annular trough so adjusted that the amount of water disposed around the periphery of the trough by centrifugal force will not exceed the static capacity of the trough.

Another object of the invention is to provide a simple open trough in a brake rim, and to control the flow of water into and out of the trough so that the cooling effect will be maintained at all times, and the splashing and spilling of water will be reduced.

These and other objects will be apparent when the following description is read in connection with the accompanying drawing, wherein:

Fig. 1 is a view of a brake rim partially in section on the line 1—1 of Fig. 2, embodying the features of the invention.

Fig. 2 is a side elevation of the apparatus of Fig. 1.

Figs. 3 and 4 show detailed sectional views of two methods of attaching the special disc to the brake rim.

In Fig. 1 a drum shaft 6 has been shown as carrying a winding drum 7. These elements are not altered by the invention, and may be of any desired construction, being shown here as merely representative of the general type of equipment to which the invention is applicable. A drum flange 8 is provided on the winding drum and is formed to receive a brake rim such as 10, which is usually securely though removably attached thereto.

The brake rim 10 has its outer circumference formed into a braking surface 11 which is bounded by the bead 12 and the drum flange 8. In modern well drilling practice this surface 11 is called upon to absorb tremendous quantities of energy and a plain rim without any special means of heat removal becomes extremely hot. This high temperature not only seriously affects the wearing qualities of the brake lining but also causes material expansion and contraction of the brake rim resulting in mechanical difficulties.

To overcome the obstacles several methods of water cooling have been evolved, one of which consists of providing a closed circulation of a cooling fluid through hollow brake rims, which method is disclosed in the patent to Spalding above referred to.

Another, and less successful, method involves pouring or spraying water onto the reverse side of the brake rim. This method, while giving a limited amount of relief, is open to several criticisms. As the hoisting drum revolves the water is thrown out by centrifugal force, wets the mechanism, and particularly affects the coefficient of friction of the brake lining or lagging. The flying water may be hot enough to injure the members of the drilling crew, or in winter may form ice.

Other operators employ a small inwardly extending flange to form a peripheral water reservoir which they keep filled by means of a small stream of water. This is an improvement, but each time the rotation of the drum is stopped the bulk of water which has been distributed around the trough falls to the bottom, overflowing and wetting the mechanism. These devices are subject to the further objection that the rims are cooled only at the bottom portion during the time they are motionless.

The present invention contemplates the provision of a wide inwardly extending flange 15 which may be attached to the rim so as to form a suitable trough. This flange may be made in parts as shown in Fig. 2 and these two parts joined by plates such as 16 and suitable bolts or screws. The outer circumferential joint between the plate 15 and the rim 11 may be made in several ways, two of which are shown in Figs. 3 and 4.

In Fig. 3 the bolts 17 hold the plate in place and a suitable seal is obtained by the use of the packing strip 18.

In Fig. 4 the plate 15 is welded to the bead 12 as indicated by the weld metal 19.

The type of joint will depend on whether or not the application is to be made in the shop or in the field, and on the material of the brake rims and plates. For example, cast iron rims which have desirable braking and wearing characteristics, are not well adapted to simple welding operations.

In order that expansion strains and distortion of the plate 15 may be eliminated the plate 15 is shown as being slightly dished near its contact with the brake rim, and this dished portion is indicated at 21. It is thought to be obvious that an expansion or contraction of either the plate or the rim relative to the other can be accommodated by this belled construction.

The inner margin 22 of the plate 15 may be turned inwardly as shown, thus providing a means tending to retain the water in the trough, particularly at the speeds of rotation at which the water is carried only partly around the trough.

Several different forms of devices for introducing the cooling fluid may be employed and there is here shown a fluid pipe or conduit 25 leading from some source of liquid under pressure. To said pipe is attached the spray head 26. As indicated by the dotted lines in Figs. 1 and 2, this spray head is set to deliver the water against the upper section of the trough and to direct water against an area extending to either side of the top center of the trough. In this way the entire surface of the brake rim is cooled even when the mechanism is not rotating since the top portion has water directed against it, which also drains down around the remaining section of the periphery.

A suitable valve 27 may be placed in the supply line 25 and can be adjusted to provide the required supply of cool water.

To maintain a reasonably low temperature it is necessary that the water be circulated through the trough so that the hot water will be removed and replaced by cool water. A positive means of removing the hot water is here shown in the form of a suction pipe 30 whose open end 31 is placed within the bottom portion of the trough. This pipe may be connected to any suction device and is shown in Fig. 1 as being connected to an ejector 32, which in turn is supplied with an actuating fluid line 34 under the control of the hand operated valve 35. This ejector may be of any well known structure such as may be commonly purchased on the market.

By proper proportioning of the water supply piping and the suction piping it will be a simple matter to insure proper circulation through the trough.

In Figs. 1 and 2 it will be noted that the end 31 of the suction pipe is spaced relatively close to the inner surface of the brake rim 11. When the drum is rotating and the water is distributed by centrifugal force around the entire trough the thickness of the layer of water will be limited to the gap between the pipe end 31 and the brake rim, and the quantity of water actually in the trough will be small compared to the total quantity of the annular trough.

It is contemplated that the position of the pipe end 31 will be adjusted so that the quantity of water in the circumferential layer during rotation will be less than the static capacity of the trough as determined by its depth.

When the drum is stationary the water will be siphoned out as it rises to the suction pipe, and when rotating the water will be siphoned out when the surface of the circumferential layer reaches the suction pipe, and therefore the greatest quantity of water will be in the trough when it is in rotation. As soon as the rotation is stopped the water collects in the bottom portion of the trough where it is immediately siphoned out.

It will be seen that the invention provides a means of circulating cooling fluid in an open trough, and so controls the quantity of fluid in the trough that spilling and splashing are substantially eliminated.

What is claimed is:

1. A water cooled braking means for hoists including a rotatable brake rim, an annular trough associated with said brake rim, a conduit to introduce water into said trough, means to direct the water from said conduit against an area extending to either side of the top centerline of said trough whereby water will drain from the top area by gravity and cool the remaining surface when the brake rim is stationary, and a suction pipe to remove water from said trough, said pipe being positioned to limit the quantity of water in said trough to less than the static liquid capacity of said trough.

2. A water cooled braking means for hoists including a brake rim rotatable in a vertical plane, an annular trough associated with said brake rim, a conduit to introduce water into said trough, means on said conduit to direct the water from said conduit against the upper part of the area to be cooled, said water being adapted to flow by gravity over the remaining area whereby the whole area will be cooled when the brake rim is stationary, and a water outlet disposed within said trough and arranged to control the amount of water in said trough.

3. The combination with a rotatable hoisting drum including a drum flange, and a brake rim mounted thereon, of a fluid cooling system for the brake rim comprising an annular trough formed on the inner surface of the brake rim, a jet positioned to discharge water into said trough, the water in said trough being responsive to the rotation of the hoisting drum and rim to be disposed in a layer around the inner periphery of the brake rim, a draw-off pipe extending into the lower portion of the brake rim and suction means connected therewith adapted to remove water when the thickness of the centrifugally formed layer exceeds a predetermined amount.

4. In combination, a rotatable brake flange, a brake rim thereon, an annular trough formed on the inner periphery of said brake rim, said trough being adapted to receive a cooling fluid, and a suction pipe adapted to remove liquid from said trough, the inlet end of said suction pipe being in close proximity to the bottom of said trough whereby said pipe may tend to maintain the fluid depth in said trough.

5. A rotatable water cooled brake rim having an annular trough, means for introducing water into said trough, and means for removing water from said trough, said last means including a discharge pipe and an ejector connected therewith.

6. A brake rim adapted to be rotated in a substantially vertical plane including an annular water receiving trough, means to introduce water into said trough, means to remove water therefrom, and means to circulate water over the inner surface of said brake rim when said rim is not rotating, said means comprising a spray head adapted to discharge water against a portion of the surface lying to either side of the top center line whereby water will drain over the remaining surface.

7. In combination, a rotatable brake flange, a brake rim thereon, an annular trough formed on the inner periphery of said brake rim, means to supply water to said trough whereby water may be displaced about the inner periphery, and suction means to remove water from said trough; said means being adapted to limit the quantity of water annularly displaced in said trough to an amount within the static capacity of said trough.

WALTER G. FITZPATRICK.
SAMUEL W. WEBSTER.